United States Patent Office 3,340,992
Patented Sept. 12, 1967

3,340,992
ARTICLE TRANSFER APPARATUS HAVING AUTOMATIC STORAGE MAGAZINE
Ariosto Seragnoli, Via Pomponia 10, Bologna, Italy
Filed Sept. 20, 1965, Ser. No. 488,710
Claims priority, application Italy, Sept. 22, 1964,
20,331/64
17 Claims. (Cl. 198—24)

In the field of automatic wrapping machines there is the trend to transfer automatically the articles from a machine, or from a set of machines, which will hereinafter be called "delivery machines," to a machine, which will be called hereinafter "reception machine," in order to undergo successive operations.

In order to match the machines in operation, it is necessary, in such a case, to compensate for the phase shiftings between the delivery of the delivery machines and the take up of the reception machines. It is known, to this end, to use transfer mechanisms, which are provided with compensating stores, in the wrapping machines. However, the prior art devices have proven to be generally unsatisfactory in performance, due to the fact that they have a limited store capacity, which is not sufficient for a practical operation, or they are too complicated in construction thereby making their operation uncertain and unreliable.

Thus, one object of this invention is to provide a transfer machanism, which is provided with an automatic buffer-store having a high storage capacity and which is extremely simple in operation, in order to allow for efficient and reliable automatic transfer of the articles.

According to another object of the invention, the delivery machines and the reception machine and the transfer mechanism are controlled by independent motors, which gives the advantage that the plant becomes practical and handy in operation.

According to still another object of the invention, it is preferably foreseen that the absorption capacity of the reception machine be substantially larger than the conveying capacity of the transfer mechanism, and that said conveying capacity be substantially larger than the delivery capacity of the delivery machines, in order to avoid any blocking up of the articles.

The present invention is described, by way of example and in a non-limitative way, in the following specification and in the enclosed drawings forming an integral part thereof and in which.

Figure 1:
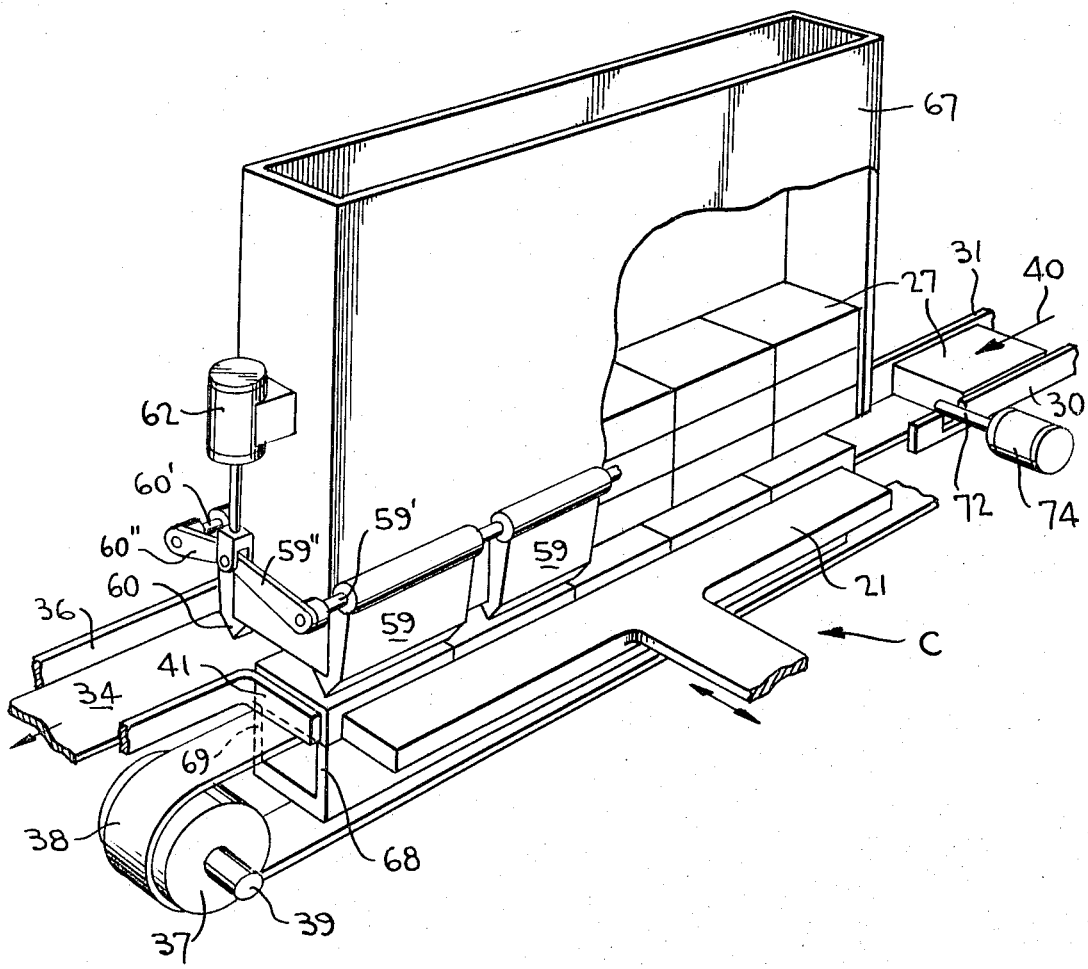
FIG. 1 is a diagrammatical, fragmentary perspective view of the mechanism.

Throughout the various figures, like reference characters will correspond to similar parts and it will be understood that movable and fixed parts which are shown and described are fixed and guided in any suitable manner in a stationary base of the machine, the base not being illustrated in the figures.

Figure 2:
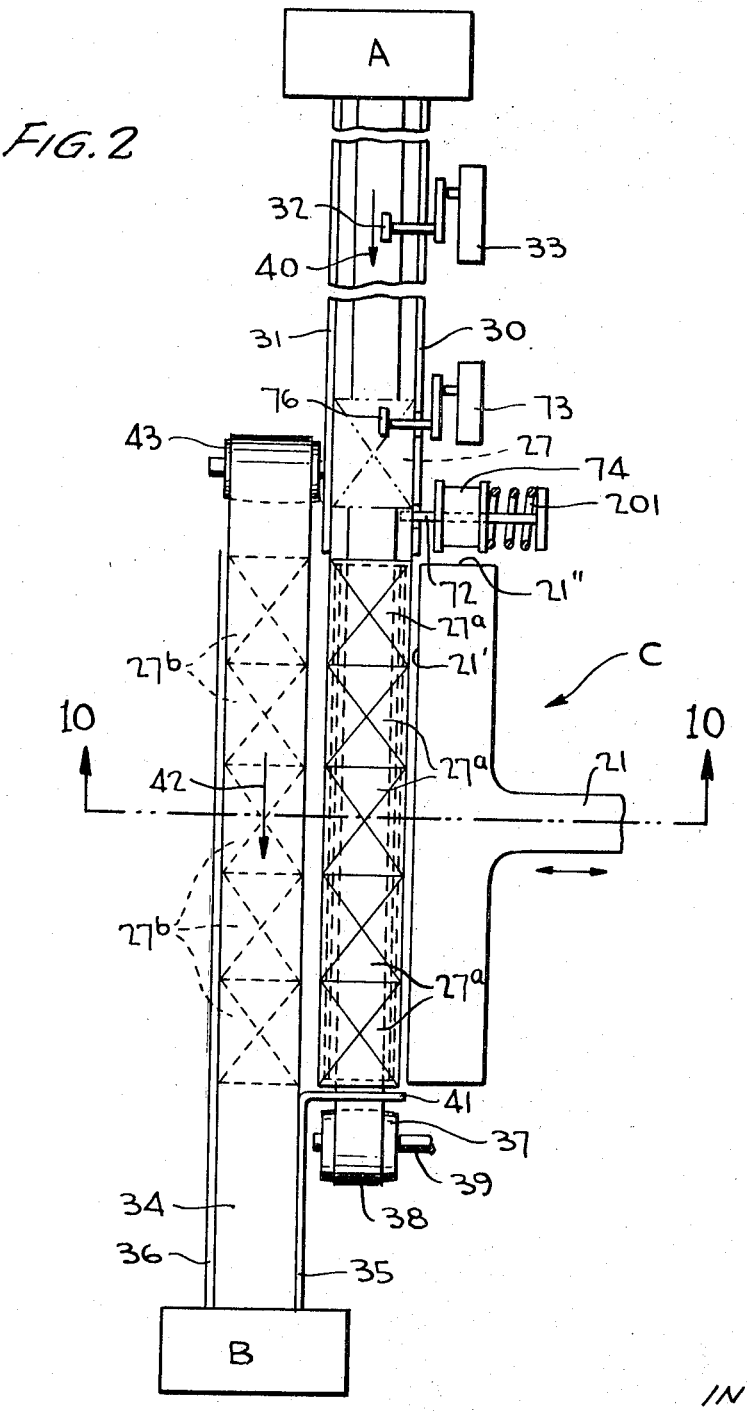
FIG. 2 is a plan, fragmentary and schematical sectional view of the mechanism looking in the direction of the line 2—2 of FIG. 3.

Referring to FIGS. 1 and 2, a delivering machine, indicated by the reference indicia A, delivers articles, through the transfer mechanism of the invention, which articles are to be passed to a receiving machine, which is indicated by reference indicia B; the reference indicia C indicating a station of the transfer mechanism.

The invention may be described by following the path of travel of representative articles, which are indicated by 27 in the drawings. Thus, an endless conveying belt 38 is wound about a first pulley 37 which is rotated and is carried by the shaft 39, and about another or second idler pulley, which is not illustrated. The upper run of the conveying belt 38 moves in the direction indicated by the arrow 40 and conveys the articles 27 (delivered by the machine A and conveyed upon the belt 38 by conventional means not represented) to the transfer mechanism of the invention. Such conveying belt 38 is preferably narrower than the articles 27, which articles therefore project along their sides from the sides of the belt (see FIG. 3).

Extending along the sides of the conveying belt 38, side boards 30, 31 are arranged, thereby forming a channel for advancing the articles 27, the bottom of the channel being formed by the conveying belt 38.

Along said conveying channel, in the direction of movement of the articles, the following elements or devices are encountered.

First, a sensitive feeler 32 for actuating an electric switch 33 is provided, said feeler bearing from above upon articles 27, which are advancing along the conveying belt 38. As will be evident, the feeler 32 is adapted to occupy two positions, that is, lower position, in correspondence to which the switch 33 is closed, when there are no articles detected under the feeler; and an upper position, in correspondence to which the switch 33 is open, when there are articles detected under said feeler. Secondly, there is provided a second sensitive feeler 76, similar to the preceding, which closes an electric switch 73 when articles are present and opens said switch 73 when articles are not present. Lastly, a pawl 72 is provided and is carried by the armature of the electromagnet 74, and said armature being provided with a return spring 201.

Under the action of said spring 201, the pawl 72, when the electromagnet 74 is not energised, keeps the position indicated by a continuous line outline in FIGURE 2 or so as to be out of the path of articles 27 and therefore so that it doesn't prevent their advance motion. On the other hand, when the electromagnet 74 is energised, the pawl 72 is pushed, through the attraction of the armature by the electromagnet so as to move said pawl 72 into the path of said articles 27 or to the position indicated by the dotted line outline of FIG. 2 and therefore so as to be operative to prevent their advance. Upon energization, the conveying belt 38 is operative to transfer the articles 27 up to a position 27a in which they abut against a stationary stop 41; therefore, the articles are accumulating backward on the conveying belt 38, which is flowing or sliding under them.

The speed of the belt 38 is selected to be high enough so that the objects or articles pushed upon the belt by the delivery machine A are spaced and thus advance, separated from each other, towards the transfer station C.

The side boards 30, 31 terminate before said stop 41, thereby leaving uncovered a gap which is sufficient to accommodate a prefixed number of articles; in the applicable figures of the drawings, said gap containing 5 articles as an example.

In the region which corresponds to said gap, there is the transfer station C, referred to above, in which the articles are transferred transversely of the belt, as it will be seen.

At said station C, sidewise in respect of the conveying belt 38, there is arranged a second or transfer belt 34, the upper run of which is in movement in the direction indicated by the arrow 42, said belt winding on an idler pulley 43 and upon a driving pulley which is not represented, said belt 34 serving to forward the articles to the receiving machine B. At the sides of said belt 34 there are arranged a side board 36 which extends from the region opposite the transfer station C up to the machine B, and a side board 35 which extends from the stop 41 up to the machine B (see FIG. 2).

Figure 3:
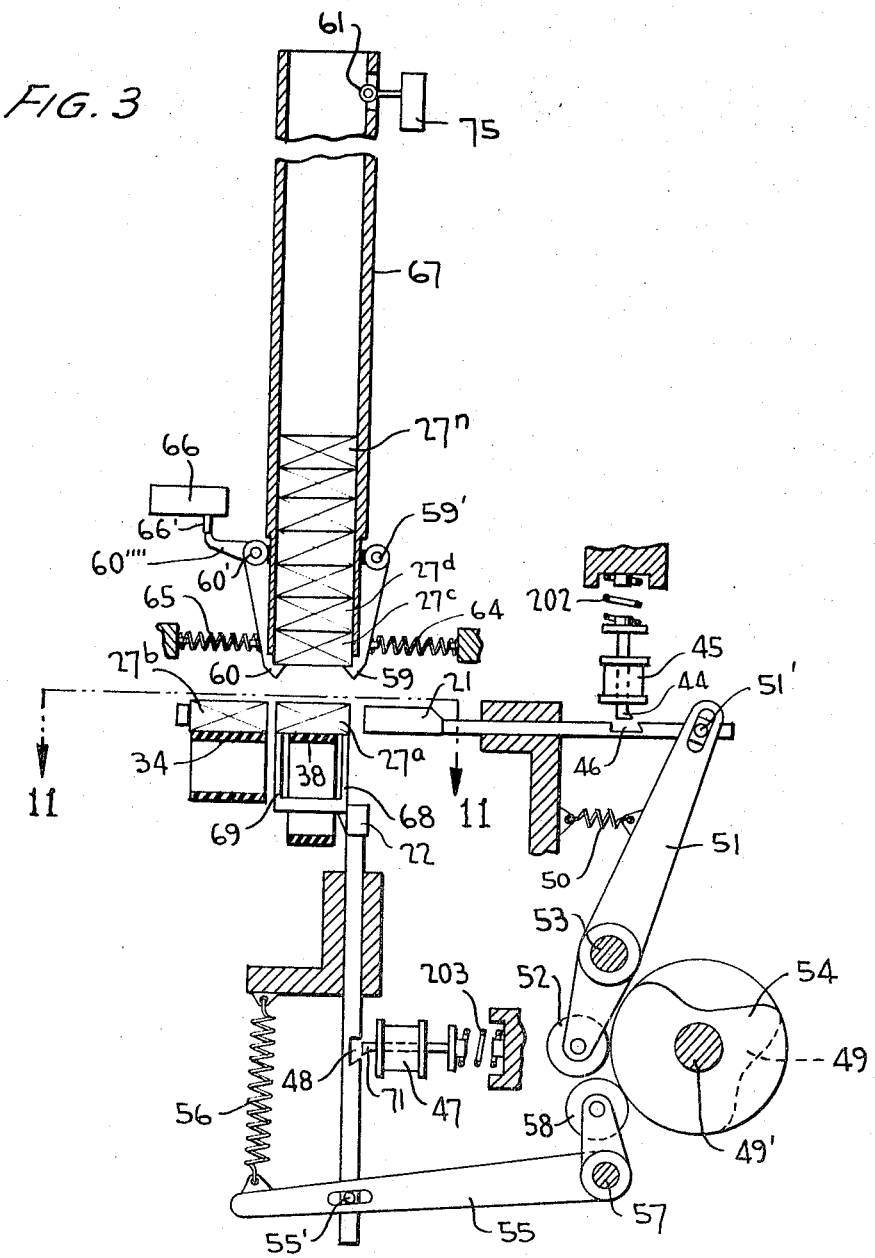
FIG. 3 is a schematic, fragmentary vertical section of the mechanism taken along the line 3—3 of FIG. 2.

In the station C, a pusher member 21 acts with a horizontal motion which is transverse with respect to said belts 38, 43 to move from the position illustrated in FIG. 2 up to a terminal position in which its front end 21' is exactly in correspondence with the articles in position 27b, illustrated in FIG. 3.

The speed of the transfer belt 34 is high enough so that all the articles in position 27a and then transferred to it into position 27b from the pusher 21, are carried out of the region opposite to the pusher in a time shorter than each transfer cycle. It can be seen that the front end 21' of the pusher is of substantially the same length as the series of articles in position 27a (see FIG. 2).

The pusher 21, guided by the base of the machine (see FIG. 3) is properly driven by the cam 49, which moves together with the shaft 49'. The cam 49 effects a complete revolution for each operating cycle of the mechanism and the movement of the pusher 21 is effected through the follower roller 52, the lever 51 pinned to the base at 53, and the small link pin 51'. The liner 51 is subjected to the action of the return spring 50 to maintain the roller in engagement with the cam 49 to thus cause the pusher 21 to move from the right. This movement is conditioned, in a way which is well known, from a pawl 44 subjected to the action of a spring 202 which keeps the pawl pushed against a corresponding depression 46 of the stem of the pusher 21. When the pusher 21 is operative to push the articles from the position 27a to the position 27b, the pawl 44 is extracted from the depression 46 under the action of the electromagnet 45 when the latter is energised. Both the pawl 44 and the depression 46 preferably have the shape of a hook as indicated in FIG. 3, so that the extraction of the pawl 44 from the depression 46, under the action of the energised electromagnet 45, is possible only when the cam 49 has displaced the pusher 21 up to the right hand position, as is indicated in FIG. 3.

In each cycle, which takes the time interval MM''' (see FIG. 5), the pusher 21 (when its movement is permitted by the pawl 44) will advance leftwards in the time interval MM' and will return rightwards in the time interval M'M'', where it remains for the whole duration of the time interval M''M'''.

At the transfer station C, positioned above the articles in position 27a, there is a storage magazine 67 of the vertical channel type which has an internal chamber of a size adapted to receive from the bottom and contain the whole set or series of articles in said position 27a (see FIGURES 1 and 3). Said magazine has, at its bottom, any number of teeth 59, 60 which, under the push exerted by springs 64, 65, are normally caused to occupy the position illustrated in FIG. 3, to support sets of the articles from the bottom in positions 27c, 27d, . . . 27n, introduced within it, as it will be seen. The lower ends of teeth 59, 60 are inclined or have a cam shape (see FIG. 3), such that they are opened overruling the elastic reaction of the springs 64, 65, when articles 27 are pushed from the bottom against them. Said teeth are carried by the shafts 59', 60' (see FIG. 1) which are rotatable within stationary supports which are not represented.

The shafts 59', 60' carry at their ends the levers 59'', 60'', connected with the armature 63 of an electromagnet 62 (FIG. 1). When said electromagnet 62 is energised, it pushes the armature 63 downwards and causes the rotation of the shafts 59', 60' in a direction such to cause the teeth 59, 60 to open.

One of the teeth 60 carries a projection, indicated by 60'''' in FIG. 3, which projection lies opposite to the push-button 66' of a switch 66, which is arranged in such way that, when the teeth 59, 60 are closed, as in FIG. 3, the switch 66 is open, and when the teeth 59, 60 are opened, the switch 66 is closed.

At the top of the magazine 67 there is arranged at least one sensitive feeler 61, which projects within the magazine under the action exerted by elastic means not represented, and is able to be projected out of the magazine by the articles in position 27a, when they rise up to said feeler. Said feeler drives an electric switch 75, which is open when the feeler 61 projects within the magazine 67 and is closed when articles engage said feeler 61.

Positioned at the station C, under the articles in position 27a is an elevator 22 which comprises a fork shaped upper portion having sides 68, 69 which surround the belt 38 at the transfer station C. The elevator 22 is movable between two positions, a lower position in which the upper ends of the sides 68, 69 are at the level of the upper face of the belt 38 itself, and an upper position in which said ends are at the level of the lower edge of the articles contained in the magazine 67 in the position 27c. The elevator 22 is guided in the base of the machine (see FIG. 3) and is driven, in a way similar in structure and operation to that already described for the driving of the pusher 21, such as by a mechanism comprising a cam 54, carried by the shaft 49', a follower roller 58, a bell crank lever 55 pivoted to the base at 57, a small link pin 55' and a tension spring 56.

The elevator 22 is caused to cooperate with the latch 71, which is resiliently pushed by the spring 203 toward the depression 48 of the stem of said elevator 22. As before, the latch 71 is connected to an electromagnet 47 for operation and the depression 48 and the end of the latch 71 are hook shaped (see FIG. 3) so that the electromagnet 47, when it is energised, is in condition to extract the latch 71 only when the elevator 22 is in the position of FIG. 3, i.e. when the projection of the latch is disengaged from the corresponding projection of the depression.

Figure 5:
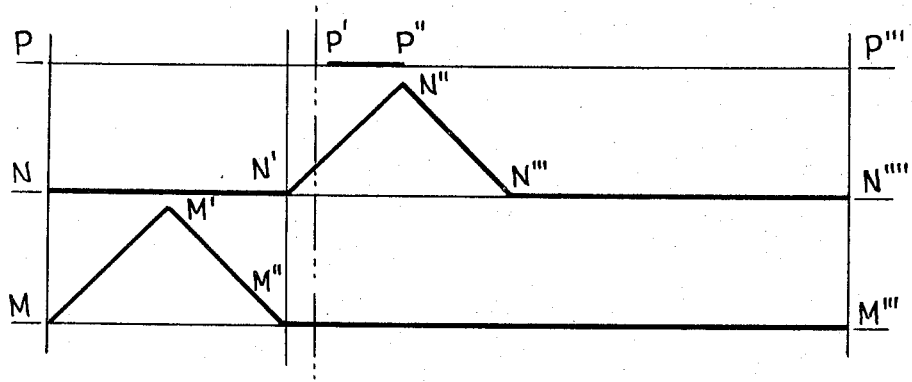
FIG. 5 is a chart showing the motion phases of some elements of the mechanism.

The movement phases of the elevator 22 (when it is permitted by the latch 71) are also indicated in FIG. 5; the elevator being stationary in the lower position during the time intervals NN' and N'''N'''' rising during the time interval N'N'', and descending during the time interval N''N'''.

Figure 4:
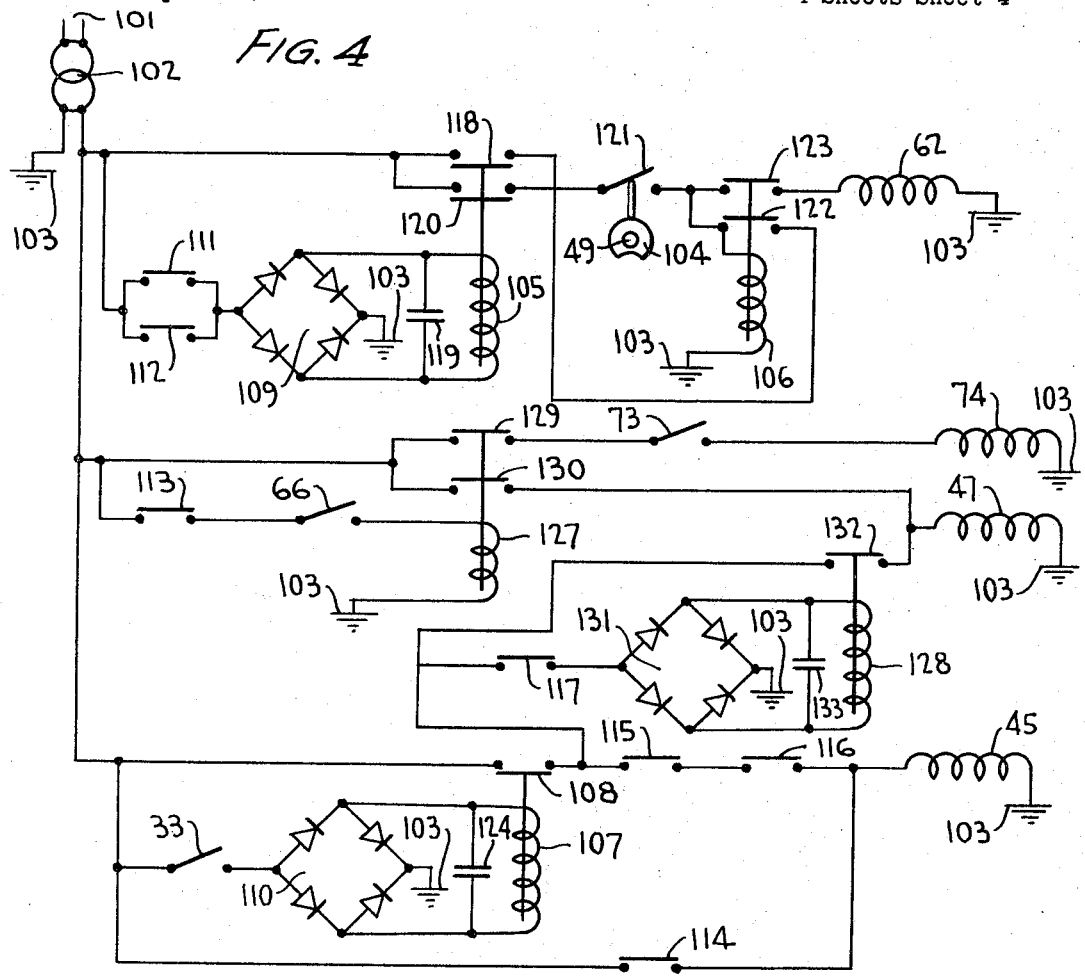
FIG. 4 is a block electrical schematic representation of a control circuit for the operation of the different parts of the mechanism.

In FIG. 4 a schematic electrical representation is illustrated of the connection to the beforementioned switches and electromagnets. Thus, reference number 102 indicates an electrical transformer, fed by an input network 101. At the transformer output, the line ends through a branch to ground 103, while the cuurent line feeds the electric circuits represented in FIG. 4; it being understood that in all of the following circuits, the ground ending is indicated by reference numeral 103.

The first circuit, starting from the top of the figure, controls the energisation of the electromagnet 62, which is in 103 to ground, it being remembered that said electromagnet causes the opening of the teeth 59, 60 of the magazine 67. By reference numeral 111, an auxiliary contact is indicated of the electric switch controlling the electric motor driving the delivery machine A; the switch being open when the machine is at rest and being closed when the machine is operating. An auxiliary contact 112 of the electric switch of the reception machine B is also shown, it being open when the machine is operaing and closed when the machine is at rest. A rectifier 109, a capacitor 119, and a driving coil 105 is provided for the armature carrying the contacts 118, 120, which are open when the coil 105 is energised and closed when the coil is not energised. A cam 104 is indicated, which rotates at the same speed of the shaft 49' and is not illustrated in the other figures, said cam 104 causing, at each cycle, the closure of a timing switch 121 in the time interval P'P'' (see FIG. 5), said switch 121 being open during the time interval PP' and P''P'''. A driving coil 106 is provided for the armature which carries the contacts 122, 123, which are closed when the coil 106 is energised and open when said coil is not energised.

The second or middle circuit controls the energisation of the electromagnet 74, which drives the blocking pawl 72 of the articles 27 on the conveying belt 38, and the energization of the electromagnet 47 which drives the latch 71 blocking the advance movement of the elevator 22. An auxiliary contact 113 of the electric switch of the delivery machine A is indicated, which is open when the machine A is at rest and is closed when the machine A is in operation. As seen before, the switch 66 is closed when the teeth 59, 60 are open to prevent energization of driving coil 127 for the armature carrying the contacts 129, 130; said contacts being closed when the coil 127 is energised. The switch 73 which senses the presence of the articles on the conveying belt 38 is closed when an article is present below it and is open in the opposite case.

The lowermost circuit in FIG. 4 controls the energisation of the electromagnet 45, said electromagnet driving the blocking pawl of the pusher 21. As seen before, the switch 33 senses the presence of articles on the conveying belt 38; the switch being open when an article is present below it and being closed in the opposite case. A rectifier 110 and a capacitor 124 are provided for the driving coil 107 for the armature carrying the contact 108, which is closed when the coil 107 is energised. Two auxiliary contacts 114, 115 are provided in the electric switch of the motor driving the machine A; the contact 114 being open when the machine A is in operation and the contact 115 being closed in this situation, the functions of the contacts switching when the machine A is at rest. Auxiliary contacts 116, 117 are further provided in the electric switch of the motor driving the machine B, both contacts being closed when the machine is in operation and being open when the machine is at rest. A rectifier 131, and a capacitor 133, are supplied for the coil 128 driving the armature which carries the contact 132, which is open when the coil 128 is energised. Through the contacts 108 and 132 the lower circuit may be able to energise the electromagnet 47, in parallel with the energisation that it can receive through the middle circuit illustrated in FIG. 4.

It is to be observed that the three partial circuits, each of which comprises a rectifier, a capacitor and a coil, 109, 119 and 105; 110, 124 and 107; 131, 133 and 128, form three time-delay relays, in which the armatures are immediately attracted when the current reaches the rectifiers and are released after a prefixed time-delay when said current is interrupted.

In the operation of the mechanism it will be assumed that both the machines A and B are in operation. The articles 27 from the delivery machine A, which are conveyed by the transport belt 38 up to the point of abutment against the stop 41, are thus crowding behind each other in position 27a so that they will create a complete set or series of articles up to the region which is below the sensitve feeler 32. While the row is not complete, the sensitive feeler 32 is raised and lowered whenever an article passes below it on the belt 38, thus each time opening the switch 33 for a small time duration. The time-delay of the partial circuit 110–124–107 is rendered longer than that duration of interruption, so that the passage of single articles doesn't cause the opening or the switch 108. However, when the row has been completed, the sensitive feeler remains in the raised position, and the contact 108, after the prefixed time-delay for charging the capacitor 124, then closes. The current, through the contacts 115 and 116, which are both closed because both the machines A and B are in operation, energises the electromagnet 45 of the blocking pawl of the pusher 21.

After that, the first time that the cam 49 reaches the position of FIG. 3, the latch 44 disengages from the depression 46 and the pusher 21 effects a stroke leftwards, transferring to the belt 34 all the articles which are situated before it in positon 27A. The belt 34, in turn, transfers said articles to the machine B. During such transfer, any other articles 27 which reach the transfer station C on the conveying belt 38 are blocked or gated by the side or gate edge 21″ of the pusher. The pusher 21 then returns to the position of FIGURES 2 and 3, and the articles 27 which are upon the conveying belt 38 are carried up to the position 27a.

If, in the meantime, on the conveying belt 38 so many articles had accumulated that, during and after such advance movement by said belt, there are still articles below the sensitive feeler 32, the electromagnet 45 remains energised and the pusher effects another stroke to transfer the next set of articles to the belt 34. When, however, during the advance movement of the belt 38 the continuity of articles below the sensitive feeler 32 ceases, the switch 33 closes and causes the release of the electromagnet 45, the latch 44 enters the depression 46 and the advance of pusher 21 is discontinued.

In the just described condition of working, the electromagnets 62, 74 and 47 are not energised and, therefore, the elevator 22 is stationary, the teeth of the magazine remain stationary, and the pawl 72 blocking the articles remains outside the conveying belt 38 and doesn't interfere with the advance movement of the articles.

It will now be assumed that the reception machine B stops while the delivering machine A continues to operate. When this happens, the contact 116 opens, causing the deactivation of the electromagnet 45 whereby the latch 44 blocks the pusher 21. The switch 117 opens and, when the switch 33 gives the "assent" signal, i.e. when on the elevator the complete row of articles in position 27a is present, the elevator 22 rises to introduce the articles between the cammed faces of the teeth 59, 60. In every case, the starting of the elevator 22 takes place, after the stopping of the machine B, with the time-delay imposed by the time-delay circuit 131, 133, 128. Said time-delay is chosen so large that the articles, which are present on the conveying belt 38 just before the transfer station C, will have the time to reach the position 27a. The sequential operation then proceeds according to the same arrangement which has been previously illustrated, except that the operation of the elevator 22 is substituted for that of the pusher 21.

If, after that, the machine B resumes operation, the release of the electromagnet 45 and the energization of the electromagnet 47 will take place simultaneously, and the operation previously described for the case that both machines A and B are operating is resumed. Let it now be assumed that, starting from said operation condition of both machines A and B, the delivery machine A comes to a stop. The auxiliary contact 111 is opened, but the contacts 118, 120 remain still opened for the whole duration of the time-delay prefixed for the time-delay circuit 109–119–105. The auxiliary contact 114, however, closes immediately, so causing the energisation of the electromagnet 45 releasing the pusher, which therefore moves rhythmically forwards and backwards, transferring from the conveying belt 38 to the conveying belt 34 those articles carried by the belt 38 in position 27a. The speed of the belt 38 is chosen so high that within the time interval M″M‴ (FIG. 5) every article present on the belt itself may be able to reach the position 27a. The time-delay of the circuit 109–119–105 is fixed at a value so high that all the articles present on the belt 38 may be in condition of being transferred, in the aforementioned way, to the belt 34.

After that said time-delay is elapsed, the contacts 118, 120 will close. Successively to the first appearance of the time interval P′P″ (see FIG. 5), the contact 121 closes and the coil 106 causes the closure of the contacts 123, so providing the current to the electromagnet 62, which causes the opening of the teeth 59, 60 of the magazine 67. The contact 122 is also closed which is a self-energization contact for the coil 106, which coil 106 therefore remains energized until one of the contacts 112 and 111 closes again.

The pusher 21 continues to move rhythmically forwards and backwards, causing, at each cycle, the transfer, to the belt 34, of all the articles which, at each cycle, from the position 27c within the magazine 67 fall into the position 27a on the conveying belt 38.

When the operation of the machine A is resumed, the teeth 59, 60 of the magazine close abruptly, gripping immediately the articles which in the subsequent cycle would have fallen into the position 27a. Through the auxiliary contact 113 of the machine A, and the switch 66, kept closed by the still open condition of the teeth, the energisation is effected of the electromagnet 47 releasing the elevator 22, so that the elevator now rises to lift and return any suspended articles within the magazine 67, leaving them after above the teeth 59, 60.

In the meantime, if the articles which on the conveying belt 38 are advancing towards the transfer station reach, within said time interval, the position below the sensitive feeler 76, raising it and causing therefore the switch 73 to close, the electromagnet 74 is energised and draws the tooth or pawl 72 into the path of the articles 27, to prevent a further advancing which would interfere with that of the elevator. Once the elevator 22 has descended again, everything returns to the normal condition, previously described, in which both the machines A and B are in operation.

Having so described the invention with reference to a preferred embodiment thereof, it will be obvious to those skilled in the art that many changes and modifications of the invention are feasible without going beyond the spirit and the scope of the invention itself, and it is understood, in the specification and in the enclosed claims, to protect all the construction forms and embodiments and variations which are within the spirit and scope of the invention itself.

In particular, the following possible changes are foreseen. For example, the number of the output channels of the delivering machine A may be chosen at will, there being in any case an equal number of magazines, elevators, pushers, and other elements. The transfer station C may be of sufficient size to hold any number of articles in position 27a.

Further, the described driving systems may be substituted by any other suitable system of a type known in the art. Also the control circuit may be changed for instance by using mechanical time-delays instead of electric. It is contemplated that these changes could thus be made without thereby exceeding the spirit and the scope of the invention or departing from the field of protection sought in this application.

What is claimed is:

1. Transfer mechanism for articles traveling from a delivery machine to a reception machine and having a high capacity for automatic storage of articles comprising the combination of a conveying belt for moving the articles from said delivery machine, a subsequent transfer belt arranged in a side-by-side manner at the same level with said conveying belt to thereby form a transfer station, a vertical storage magazine having a width sufficient to contain sets of articles charged together, releasable means on said magazine to selectively release said sets of articles, said storage magazine being arranged above said conveying belt at said transfer station, a pusher member positioned at said transfer station, drive means to reciprocate said pusher member transversely of said belts to transfer a set of articles from said conveying belt underlying said storage magazine to said transfer belt, an elevator positioned at said transfer station and aligned with said storage magazine, power means to reciprocate said elevator with a vertical reciprocating motion to move a set of articles from said conveying belt into said storage magazine, whereby a set of articles may be selectively supplied to and withdrawn from said transfer station by said releasable means and said elevator, respectively, to maintain the flow of articles from said delivery machine to said reception machine substantially constant.

2. Mechanism according to claim 1 wherein said provided side boards cooperating with said belts to form channels for said articles, a gap in said side boards at said transfer station so that the transfer of the articles from said conveying belt to said transfer belt is permitted.

3. Mechanism according to claim 1, wherein means is provided to drive said belts at a constant speed.

4. Mechanism according to claim 1, wherein is provided a stationary stop above said conveying belt for stopping the articles arriving from said delivery machine to thereby form said set of articles.

5. Mechanism according to claim 1, wherein said releasable means for supporting the articles in said storage magazine comprises teeth means movable between a first position and a second position, said first and second positions being such as to hold said articles in said magazine and to release said articles, respectively, spring means to bias said teeth means into said first position, electromagnet means to move said teeth means against said spring means to said second position, and cam means formed on the inner faces of said teeth means to move said teeth means to said second position in response to articles moving into said storage magazine from below by action of said elevator.

6. Mechanism according to claim 1, wherein is provided a control circuit having switch means for controlling said drive means for said pusher member whereby operation of said drive means takes place only when said reception machine is operative.

7. Mechanism according to claim 1, wherein is provided a control circuit having a switch means for controlling said power means for said elevator whereby operation of said power means takes place only when said delivery machine is operative and said reception machine is inoperative.

8. Mechanism according to claim 4, wherein is provided a control circuit having switch means for controlling said pusher member and said elevator, said switch means being located upstream of said storage magazine and operative to permit operation of said pusher member and said elevator only upon detection of a continuous line of articles from said stationary stop to said detecting means.

9. Mechanism according to claim 5, wherein is provided a blocking pawl along said conveying belt upstream of the storage magazine, a control circuit having switch means for operating said blocking pawl, said switch means being responsive to the presence of articles on said belt, said control circuit having additional switch means for controlling said blocking pawl in response to the operative condition of said delivery machine and said teeth means, whereby when the delivery machine is in operation and the teeth of the magazine are opened and an article is present below said switch means, the blocking pawl is pushed into the path of the articles on said first belt, to prevent the advance movement of the articles toward said magazinne.

10. Mechanism according to claim 1, wherein said conveying belt is narrower than said articles so that said articles project from the belt along their sides, said elevator having a forklike shape with the two upper ends of said elevator surrounding said conveying belt so as to be adapted to raise the articles from the belt to the magazine.

11. Mechanism according to claim 1, wherein is provided a control circuit having a switch positioned in said magazine at the top thereof, said switch being operative to interrupt the operation of the delivery machine when said magazine is full of articles.

12. Mechanism according to claim 1, wherein is provided means to prevent simultaneous movement of the pusher member and of the elevator into said transfer station.

13. Mechanism according to claim 1 wherein said drive means for said pusher member and said power means for said elevator comprise a first and second cam respectively, said cams rotating at the same speed, yieldable means interconnecting said cams to said pusher member and said elevator, and control latches for rendering said pusher member and said elevator inoperative.

14. Mechanism according to claim 1, wherein is provided a control circuit for said pusher member, said circuit having switch means responsive to the operation of the delivery and reception machines to allow for the movement of the pusher member and additional switch means to allow for the movement of the pusher member when the delivery machine is inoperative.

15. Mechanism according to claim 1, wherein is provided a control circuit for said elevator, said circuit having switch means to allow operation of the elevator only when the reception machine is inoperative and articles are present on said conveying belt.

16. Mechanism according to claim 5, wherein is provided a control circuit, a solenoid for operating said teeth means, switch means responsive to the operation of the delivery and reception machines for controlling said solenoid whereby the teeth means open only when the delivery machine is at rest and when the reception machine is operative, and timing means for controlling said solenoid whereby the opening of said teeth means takes place so as not to interfere with said pusher member.

17. Mechanism according to claim 9, wherein is provided a control circuit for said elevator, said circuit having switch means responsive to the operation of the delivery machine and the positioning of said teeth means in the open position for controlling the operation of said elevator.

References Cited
UNITED STATES PATENTS
1,609,802   12/1926   Ekstrom _____ 198—24

EVON C. BLUNK, *Primary Examiner.*

EDWARD A. SROKA, *Examiner.*